United States Patent Office 3,298,922
Patented Jan. 17, 1967

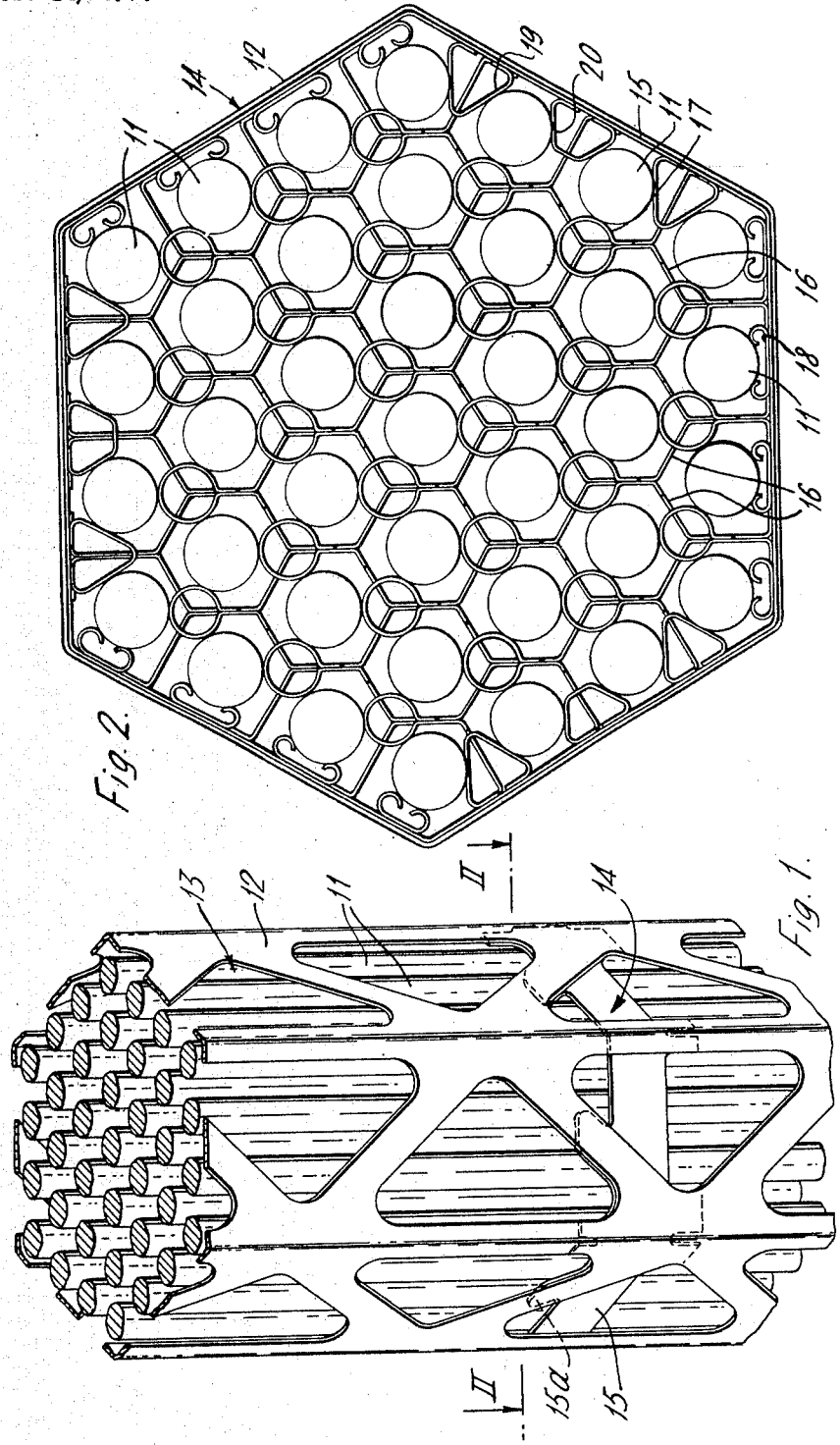

3,298,922
NUCLEAR FUEL ASSEMBLY
Michael John Prince, Widnes, and Arthur Edwards Timbs, Flixton, England, assignors to Societe Anglo-Belge Vulcain S.A., Brussels, Belgium
Filed Feb. 14, 1964, Ser. No. 345,029
Claims priority, application Great Britain, Dec. 16, 1963, 49,663/63
4 Claims. (Cl. 176—78)

This invention relates to nuclear fuel assemblies such as comprise a plurality of elongate fuel elements supported in a bundle with their longitudinal axes parallel. It is conventional to cool these assemblies by means of a stream of coolant medium, such as water, which flows between the fuel elements in a direction parallel to their longitudinal axes. Means are incorporated in the fuel assemblies to space the fuel elements. In previous fuel assemblies these means have comprised cellular grids penetrated by the fuel elements, projections carried by the grid serving to engage and locate the fuel elements. The development of spacing grids for nuclear fuel assemblies has been concentrated on achieving a robust grid which offers small resistance to fluid flow and which is economical to fabricate whilst ensuring a high degree of accuracy in spacing the fuel elements from each other.

In one embodiment of the invention a nuclear fuel assembly comprises a plurality of elongate fuel elements supported in a bundle with their longitudinal axes parallel, a cellular grid of sinuous metal strips assembled to define hexagonal cells which are penetrated by the fuel elements, slots extending lengthwise of the strips at alternate cell corners, and resilient rings secured into the slots with their axes parallel to the longitudinal axes of the fuel elements so as to be each interposed as a spacer between three adjacent fuel elements, each ring being locked immovably into a socket formed by co-operating slots in adjacent strips.

Figure 3:
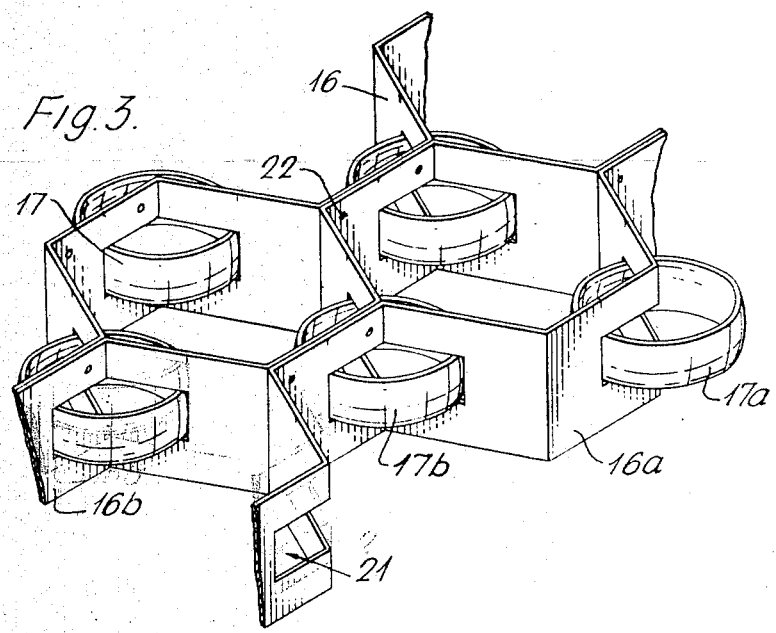
Figure 4:
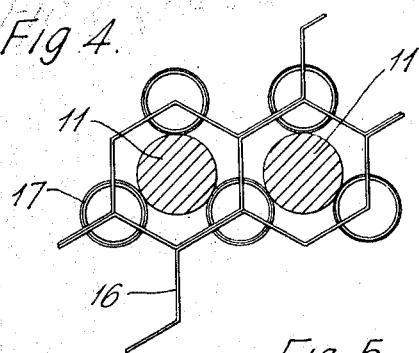
Figure 5:
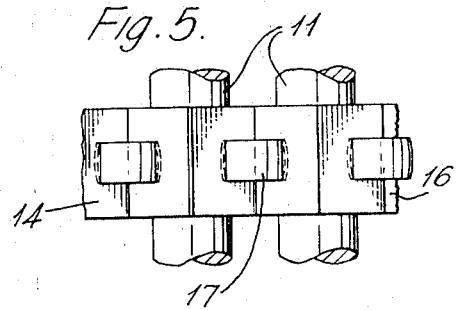

On construction of fuel assembly embodying the invention will now be described by way of example with reference to the accompanying drawings in which:

FIGURE 1 is a perspective view of the fuel assembly,
FIGURE 2 is a sectional view on the line II—II of FIGURE 1,
FIGURE 3 is a perspective view of a part of a spacing grid embodied in the fuel assembly,
FIGURE 4 is a plan view of the structure of FIGURE 3 when penetrated by fuel elements, and
FIGURE 5 is an elevation of the structure of FIGURE 4.

The nuclear fuel assembly (FIGURES 1 and 2) embodies a bundle of 37 elongate fuel elements 11 which are arranged with their longitudinal axes parallel and each of which is constituted by a stack of pellets of uranium dioxide encased in a stainless steel tubular sheath. These fuel elements have a length of approximately one metre and are supported at their ends by top and bottom support grids (not shown). The fuel elements are arranged on a triangular pitch (when viewed in plan) and grouped so that the assembly has a hexagonal outline. The fuel element bundle is housed in a hexagonal sheath 12 through which reactor coolant is to flow. Triangular apertures 13 permit cross flow of coolant between adjacent assemblies. When in position in a nuclear reactor, for example a water moderated and cooled reactor, the fuel assembly is swept by a stream of water which flows longitudinally of the fuel elements. At intervals along the length of the fuel elements are three grids 14 which serve to space the elements from each other.

Each grid (FIGURE 2) has an outer band 15 of hexagonal section which is welded to the inner face of the sheath 12 and a web of stainless steel strips 16 which are bent in a zig-zag manner and are welded together to define thirty-seven hexagonal cells. Flanges at the edges of the strips 16 are welded to the outer band 15. The cells are each penetrated by a fuel element. These fuel elements are located by means of resilient rings 17 carried by the grid and by marginal spacers 18, 19 and 20 of B-section, triangular section and trapezoidal section respectively which are welded to the inner face of the outer band as to contact the outer hexagonal ring of fuel elements. The loop spacers 17 and marginal spacers 18, 19 and 20 are copolanar.

Resilient rings 17 (FIGURES 3, 4 and 5) are secured immovably into the grid so as to be interposed as spacers between adjacent fuel elements. As shown in FIGURE 4 each ring 17 engages three adjacent fuel elements and each fuel element is engaged by three rings. The rings are barrelshaped so that they make point contact with the fuel elements and are manufactured with an accurate outside diameter, this dimension being the factor which determines the spacing between fuel elements in the assembly. The resilience of the rings is such that they yield, under stresses set up in the fuel assembly, and thus avoid deformation of the fuel element sheaths. Similarly the grid is deformable to permit lateral movement of the rings as necessary to accommodate relative movement of the fuel pins. Axial movement of the rings is restrained by the grid.

In fabricating the spacer grid the metal strips 16 are prepared by cutting slots 21 into them. These slots are rectangular with a length, in the direction of the strip length, equal to the outside diameter of the rings 17 and a breadth equal to the depth of the rings. The strips are then bent in a zig-zag manner with alternate bends passing through the centres of the slots (see FIGURE 1). Rings 17 are secured into the slots, in which they are a push fit, and the grid is assembled by spot welds 22 between adjacent strips. The rings are locked immovably into the grid by co-operation of slots in adjacent strips; thus the ring 17a in the incomplete grid shown in FIGURE 3 could be removed from its slot in the strip 16a whereas the ring 17b could not be removed from its slots in the adjacent strips 16a and 16b without parting the strips.

It is to be understood that the invention is not limited by the details of the foregoing example. Grids in accordance with the invention have the advantage that they can be fabricated from simple components and yet form a robust structure; in particular the vital spacing rings, whose dimensions determine the spacing of the fuel element, can be accurately prepared by cheap machining operations, such as by cutting them from a long tube of the required outside diameter which has previously been formed into a plurality of connected barrel-shaped loops.

We claim:
1. A nuclear fuel assembly comprising a plurality of elongate fuel elements supported in a bundle with their longitudinal axes parallel, a cellular grid penetrated by the fuel elements, and resilient rings secured immovably into the grid and interposed as spacers between and in contact with adjacent fuel elements, said cellular grid comprising sinuous metal strips defining polygonal cells penetrated by the fuel elements, said metal strips having closed slots formed therein which are boundaried on all sides by the metal of the strips, the slots of each strip being located at cell corners and extending lengthwise outwardly from the corners to form closed sockets in cooperation with slots in an adjacent strip, the resilient rings being secured immovably into the sockets with the ring axes parallel to the longitudinal axes of the fuel elements and each ring being in contact with adjacent fuel elements.

2. A nuclear fuel assembly as set forth in claim 1 wherein the metal strips and the slots formed therein extend outwardly from the cell corners in three directions, the depth of the slots measured parallel to the longitudinal axes of the fuel elements being substantially equal to the depth of the rings measured parallel to their longitudinal axes, and the radially outermost extent of each slot from the cell corner being substantially equal to the outer radius of the rings.

3. A nuclear fuel assembly as claimed in claim 1 wherein the cells are of hexagonal form and the slots extend lengthwise of the strips at alternate cell corners.

4. A nuclear fuel assembly as claimed in claim 1 wherein each ring is in contact with three adjacent fuel elements, and wherein each fuel element is contacted by at least three rings.

References Cited by the Examiner

UNITED STATES PATENTS 3,070,534  12/1962  Kooistra _____ 176—78

FOREIGN PATENTS 625,535    3/1963   Belgium.
1,086,356  8/1960   Germany.
822,790    10/1959  Great Britain.
972,101    10/1964  Great Britain.

CARL D. QUARFORTH, *Primary Examiner.*

LEON D. ROSDOL, *Examiner.*

H. E. BEHREND, *Assistant Examiner.*